Dec. 16, 1969 SHOJI TAKAOKA 3,484,653

DOUBLE-FUSE CIRCUIT

Filed Dec. 18, 1967

INVENTOR

Shoji Takaoka

BY Hall, Pollock & Vande Sande

ATTORNEY

United States Patent Office 3,484,653

Patented Dec. 16, 1969

3,484,653

DOUBLE-FUSE CIRCUIT

Shoji Takaoka, Nagoya-shi, Japan, assignor to Nippon Koatsu Denki Kabushiki Kaisha, Nagoya-shi, Japan, a corporation of Japan Filed Dec. 18, 1967, Ser. No. 691,360
Int. Cl. H02h 5/04
U.S. Cl. 317—40 1 Claim

ABSTRACT OF THE DISCLOSURE

This specification discloses a double-fuse circuit, comprising a separate first shot fuse, a second shot fuse, and a sulfide semiconductor element of such a property that it normally represents a high resistance and the resistance is rapidly decreased with a rise in temperature so that the element becomes conductive, said semiconductor element being connected in series with said second shot fuse, the series circuit of said second shot fuse and said semiconductor element being connected in parallel with said first shot fuse, wherein when the first shot fuse has blown off, the line is automatically switched to the second shot fuse, and by replacing the first shot fuse which has been blown with a new one, the current is again caused to flow substantially through the first shot fuse.

BACKGROUND OF THE INVENTION

This invention relates to a double-fuse circuit, and more particularly it pertains to such a circuit so designed that when the first shot fuse is blown, the line is automatically switched to the second shot fuse, and that by replacing the first shot fuse blown with a new one, the current is again caused to transfer substantially through the first shot fuse.

In the conventional double-fuse circuit, a mechanical switch was used as transfer switching means. That is, in the prior art system, when the first shot fuse has been blown, the switching of the line to the second shot fuse is effected by actuating a movable contact into contact with a fixed contact provided on the second shot fuse side thereby switching the line to the second shot fuse.

SUMMARY OF THE INVENTION

It is an object of this invention to provide a double-fuse circuit which can be applied to a fuse cutout circuit provided on the primary side of a distribution transformer or the like so as to be effective with respect to a fuse cut-off due to an over-load of the transformer, a lightening surge or the like.

That is, when the first shot fuse has blown by a relatively low over-current flowing therethrough, the semiconductor element is momentarily caused to perform a switching operation so that the current flow is transferred to the second shot fuse, thus permitting uninterrupted power supply. In this case, by providing any indicator means to indicate the fact that the first shot fuse has blown, it is possible to indicate the over-load of the transformer. Furthermore, by replacing the cut-off first shot fuse with a new one, the power supply is automatically switched from the second shot fuse circuit to the first shot fuse due to the operation of the semiconductor element.

Other objects, features and advantages of this invention will become apparent from the following description taken in conjunction with the accompanying drawings.

DESCRIPTION OF THE PREFERRED EMBODIMENT

Figure 1:
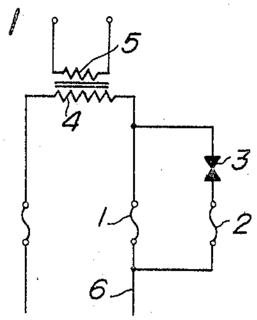
FIG. 1 is a circuit diagram showing the double-fuse circuit according to an embodiment of this invention, which is applied to the primary circuit of a distribution transformer.

Referring to FIG. 1, a first shot fuse 1 is inserted in a line, and a series circuit of a second shot fuse 2 and semiconductor element 3 is connected in parallel with the first shot fuse 1, so that the semiconductor element 3 is automatically enabled to perform the switching operation when the first shot fuse 1 is blown. The reference numeral 4 represents the primary winding of a distribution transformer, 5 the secondary winding of the transformer, and 6 a distribution line. Such semiconductor element is of such a negative resistance characteristic that it initially represents a high resistance and when a current flows therethrough, heat is produced therein so that such resistance is decreased. Also, when a certain temperature is reached, the element represents a conduction characteristic like metal, since transition of the element occurs so that the resistance is rapidly decreased.

By way of example, the inventor examined a short cylindrical silver sulfide semiconductor body 14 mm. in diameter and 5 mm. in length and performed experiments. The experimental results are as follows:

(1) Temperature characteristics of the silver sulfide semiconductor element

Figure 3:
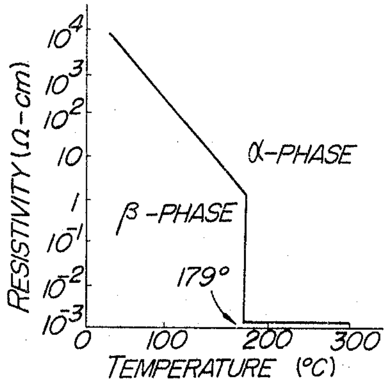
FIG. 3 is a view showing the resistance-temperature characteristic of a silver sulfide semiconductor element.

The typical resistance-temperature characteristic of a silver sulfide semiconductor is as shown in FIG. 3. That is, the silver sulfide semiconductor element behaves like an N-type semiconductor with a high negative temperature coefficient at temperatures lower than 179° C. On the other hand, it represents substantially the same conductivity as that of a metal at temperature higher than 179° C. Furthermore, at the transition temperature, the resistance of the silver sulfide element is discontinuously decreased by about three orders of magnitude. In the temperature range above the transition point, the element represents a resistivity as low as $10^{-3}$ Ω-cm. and a positive temperature coefficient. Also, in such a temperature range, the element represents so low as resistance that a high current can easily be caused to flow therethrough.

(2) Electrical characteristics of the silver sulfide semiconductor

Figure 2A:
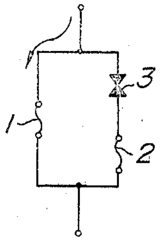
FIG. 2 is a view illustrating the circuit operation of the double-fuse circuit as in use.
Figure 2B:
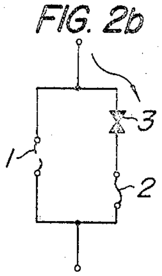
Figure 2C:
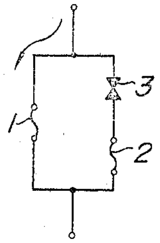

The operation of the silver sulfide semiconductor element will be seen from FIG. 2. That is, FIG. 2(*a*) shows the case where the first shot fuse 1 is not blown and a current is flowing therethrough, FIG. 2(*b*) shows the case where the first shot fuse 1 is blown and the second shot fuse 2 is working, and FIG. 2(*c*) shows the case where the first shot fuse is replaced so that the current path is returned from the second shot fuse side to the first shot fuse side.

Assume that the first shot fuse is 8 A one (resistance: 0.026Ω), that the second shot fuse is 12 A one (resistance: 0.013Ω), and that a current of 16 amperes is caused to flow through the line. Then, the current flowing through the second shot fuse is lower than 1.5 ma., as can be derived from Equation 1. Thus, practically no problem will arise if it is considered that the current flows through only the first shot fuse.

$$\frac{I_2}{I}=\frac{r_1}{r_1+r_2+R} \qquad (1)$$

where I is the over-all current, $I_2$ is the current flowing through the second shot fuse, $r_1$ is the resistance of the first shot fuse, $r_2$ is the resistance of the second shot fuse, and R is the resistance of the silver sulfide semiconductor element.

Figure 4:
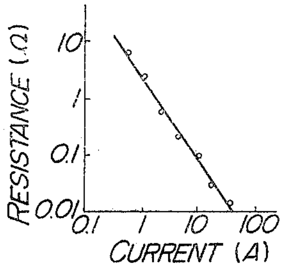
FIG. 4 is a view showing the resistance-current characteristic of such silver sulfide semiconductor element.
Figure 5:
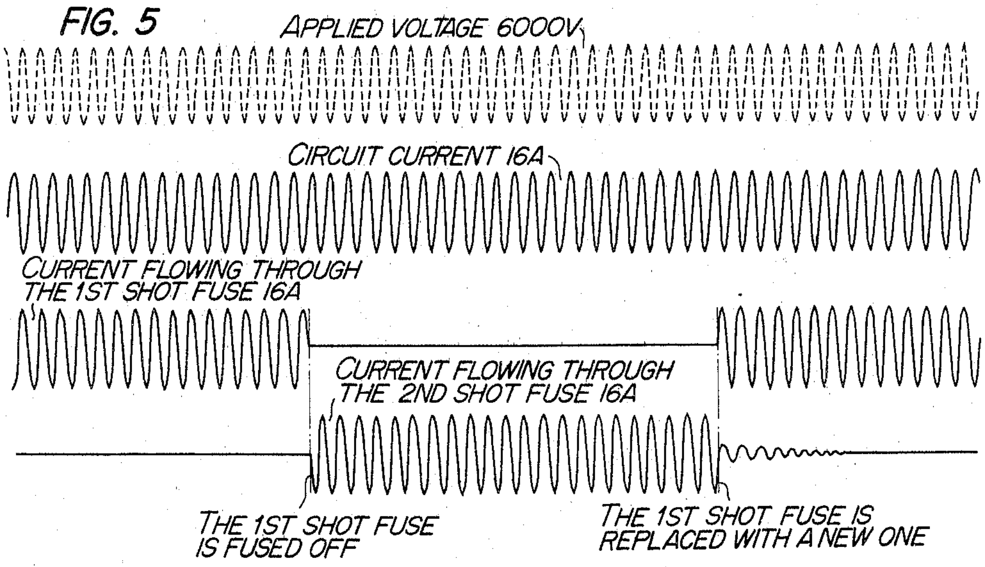
FIG. 5 is a view illustrating the current transition characteristics showing the operational process as illustrated in FIG. 2.

In case the first shot fuse is blown by an overload current, the voltage is applied to the second shot fuse so that the resistance of the silver sulfide semiconductor element is rapidly decreased. Thus, the element is changed from $\beta$-phase to $\alpha$-phase so as to be equivalent to a metal in respect of conductivity. Consequently, the over-all current will now flow through the second shot fuse. If the first shot fuse, which has been blown, is replaced with a new one, then the current will initially flow through both the first and second shot fuses in accordance with the resistance ratio, as will be apparent from Equation 1. However, a decrease in the current flowing through the semiconductor element results in an increased resistance of the element, as can be understood from FIG. 4. Thus, when the first shot fuse is replaced by a new one, the current flowing through the second shot fuse is linearly decreased, so that resistance (R) of the element is increased as will be seen from FIG. 4. In this way, the current flowing through the second shot fuse is decreased in accordance with Equation 1. Such relationship will continuously develop so that the current flowing through the second shot fuse is decreased as shown in FIG. 5 while the current flowing through the first shot fuse is increased until the over-all current transfer through the first shot fuse at last as shown in FIG. 2(*c*). Thus, the circuit will again assume the original stage as shown in FIG. 2(*a*).

As described above, in accordance with this invention, when the first shot fuse is blown, the line is automatically switched to the second shot fuse so that an uniterrupted power supply can be achieved, and by replacing the first shot fuse which fused off with a new one, the line can again be switched to the first shot fuse. Furthermore, in accordance with this invention, as transfer element, use is made of a semiconductor element representing a negative resistance and large resistance changes due to phase transition, so that there is no need to provide any complicated movable member such as a mechanical switch or the like employed in the prior art.

I claim:

1. A double-fuse circuit, comprising a separate first shot fuse, a second shot fuse, and a sulfide semiconductor element of such a property that it normally represents a high resistance and the resistance is rapidly decreased with a rise in temperature so that the element becomes conductive, said semiconductor element being connected in series with said second shot fuse, the series circuit of said second shot fuse and said semiconductor element being connected in parallel with said first shot fuse, wherein when the first shot fuse is fused off, the line is automatically switched to the second shot fuse, and by replacing the first shot fuse which has been fused off with a new one, the current is again caused to transfer substantially through the first shot fuse.

References Cited

UNITED STATES PATENTS

| | | | |
|---|---|---|---|
| 835,388 | 11/1906 | Berg | 317—40 |
| 3,172,011 | 3/1965 | Flanagan | 317—41 |

LEE T. HIX, Primary Examiner

J. D. TRAMMELL, Assistant Examiner

U.S. Cl. X.R.

317—41